March 20, 1962 G. E. PIHL 3,026,474
DISSIPATION FACTOR METER
Filed Sept. 23, 1960 5 Sheets-Sheet 1

INVENTOR.
GEORGE E. PIHL
BY
ATTORNEYS

March 20, 1962  G. E. PIHL  3,026,474
DISSIPATION FACTOR METER
Filed Sept. 23, 1960  5 Sheets-Sheet 2

DISSIPATION FACTOR METER

INVENTOR.
GEORGE E. PIHL
BY
ATTORNEYS

March 20, 1962 G. E. PIHL 3,026,474
DISSIPATION FACTOR METER
Filed Sept. 23, 1960 5 Sheets-Sheet 3

INVENTOR.
GEORGE E. PIHL
BY
ATTORNEYS

March 20, 1962

G. E. PIHL 3,026,474

DISSIPATION FACTOR METER

Filed Sept. 23, 1960

INVENTOR.
GEORGE E. PIHL
BY

ATTORNEYS

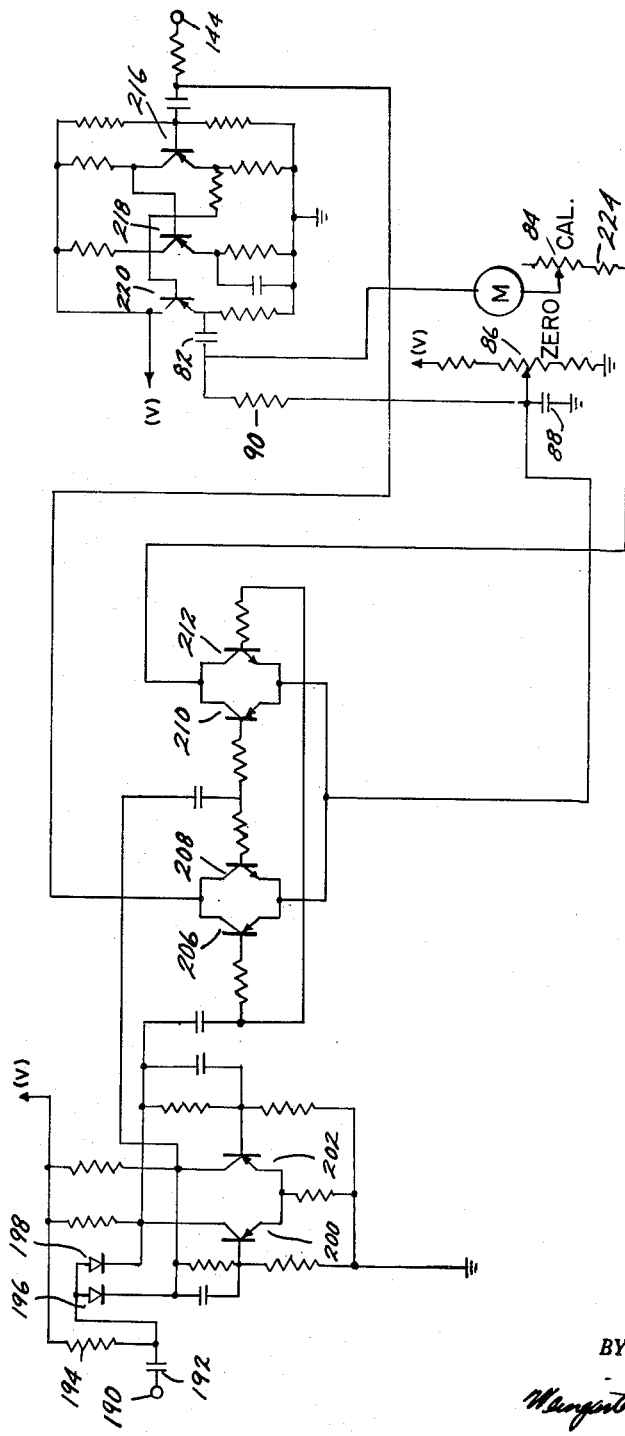

United States Patent Office 3,026,474
Patented Mar. 20, 1962

3,026,474
DISSIPATION FACTOR METER
George E. Pihl, Abington, Mass., assignor to Technology Instrument Corporation of Acton, Acton, Mass., a corporation of Massachusetts
Filed Sept. 23, 1960, Ser. No. 58,102
6 Claims. (Cl. 324—60)

This invention relates to an electronic measuring apparatus and more particularly to an instrument for measuring the dissipation factor of a capacitor.

The primary object of the present invention is to provide a dissipation factor meter capable of rapidly providing a precise and accurate measurement of dissipation factor or defect angle of a capacitor.

A specific object of the present invention is to provide a dissipation factor measuring device which directly compares the nearly 90° phase angles of an unknown capacitor and a standard capacitor and produces a D.C. output proportional to the difference between said phase angles.

A more specific object of the present invention is to provide a dissipation factor measuring instrument which comprises two series R-C circuits, one involving a standard capacitor and the other involving an unknown capacitor, means for alternately keying the R and C voltages (nearly 90° out of phase) of each circuit to a single flip-flop phase meter whereby one output of the flip-flop consists of pulses of nearly 90° width produced alternately by the two R-C circuits and the other flip-flop output consists of pulses of nearly 270° width produced alternately by the two circuits, means for alternately keying said two flip-flop outputs in synchronism with the R-C circuit keying to produce a useful output pulse train consisting of pulses of nearly 90° width produced by one circuit alternating with pulses of nearly 270° produced by the other circuit, means for integrating the pulse train to produce a D.C. output proportional to the difference in the nearly 90° phase angles produced by the standard and unknown capacitors, means for amplifying said D.C. output, and means responsive to said D.C. output for indicating the dissipation factor or defect angle of the unknown capacitor.

Other objects and many of the attendant advantages of the present invention will become more apparent as reference is had to the following detailed specification when considered together with the accompanying drawings wherein:

FIG. 5 is a diagram of the chopper amplifier circuit, the output meter circuit, and the switching circuits for keying the chopper amplifier.

The dissipation factor of a capacitor is represented by the following formula:

$$D = \frac{R_{cx}}{X_{cx}}$$

where $R_{cx}$ equals the leakage resistance of the capacitor and $X_{cx}$ equals the capacitive reactance of the capacitor.

The dissipation factor of an unknown capacitor is easily obtained with an instrument embodying the present invention. The working principle of the invention can be described briefly as follows: Two series R-C circuits are set up, one involving a standard capacitor and the other involving the unknown capacitor. The R and C voltages (nearly 90° out of phase) from each of the two R-C circuits are alternately applied to the input of a pair of clipper amplifiers. The clippers trigger a standard flip-flop circuit. The clippers and the flip-flop together form a conventional phase meter. One output of the flip-flop consists of pulses of nearly 90° width produced alternately by the standard R-C circuit and the unknown R-C circuit. The other output of the flip-flop consists of nearly 270°-width pulses which are produced alternately by the standard R-C circuit and the unknown R-C circuit. The two outputs are keyed in synchronism with keying of the input R-C circuits such that a useful pulse train output is produced which consists of the summation of the alternately keyed pulse trains of nearly 90° width and nearly 270° width, one produced by the standard R-C circuit and the other produced by the unknown R-C circuit. This useful pulse train output is then integrated to produce a D.C. output which is directly proportional to the difference in the nearly 90° phase angles produced by the standard and unknown capacitors. If the difference in phase angles is zero, there will be zero D.C. output. Assuming that the standard capacitor is a good one, having negligible dissipation, then the D.C. output is a measure of the dissipation factor of the unknown capacitor. Since the magnitude of the D.C. voltage is very low, it is best amplified by a chopper amplifier (synchronous type) before application to the indicating meter which forms part of the instrument.

Figure 1:
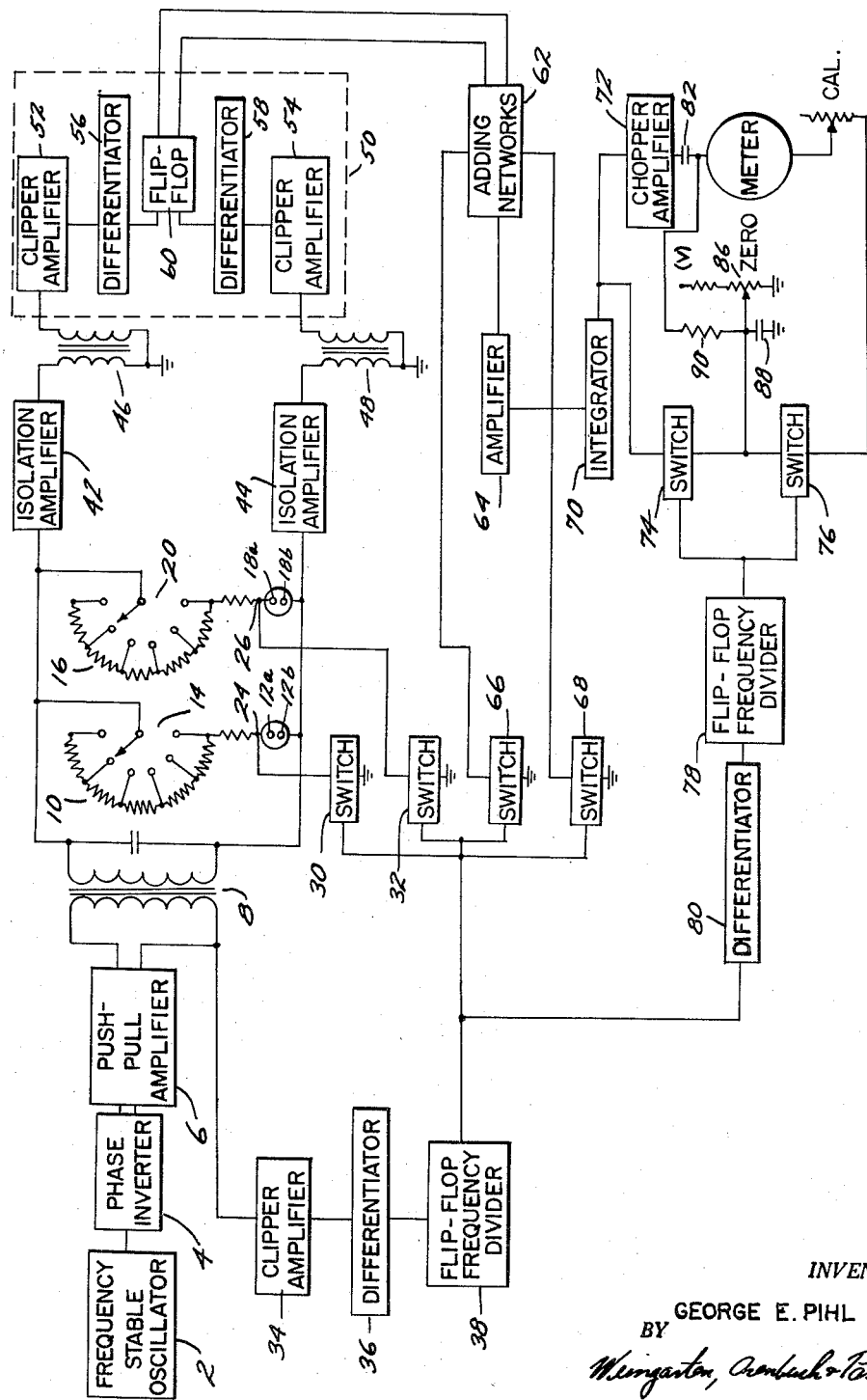
FIG. 1 is a block diagram of the present invention.

Referring now to FIG. 1, the invention comprises a frequency stable oscillator 2, preferably fork controlled, whose output is applied to a phase inverter 4. The two outputs of the phase inverter 4 are power amplified by a push-pull amplifier 6. The sine wave output of amplifier 6 is applied by a transformer 8 to standard and unknown R-C series circuits in parallel. The standard R-C circuit comprises a plurality of resistors 10 connected in series with two terminals 12a, 12b to which a standard capacitor may be connected. The resistors 10 are also connected to different taps of a rotary switch 14. The rotary contact of switch 14 is connected to the secondary of the transformer 8, as is the terminal 12b. The unknown R-C circuit consists of a second like plurality of resistors 16 which are connected in series with each other and also with a second pair of terminals 18a, 18b between which an unknown capacitor may be connected. The resistors 16 are also connected to the taps of a rotary switch 20 having a rotary contact which is connected in series with the secondary of transformer 8 and the terminal 18b. The R in each circuit is adjustable so as to accommodate various values of C, whereby to keep the R and C voltages approximately equal. The junction 24 of the standard R and C and the junction 26 of the standard R and unknown C are alternately grounded by two electronic switches 30 and 32. Switches 30 and 32 are actuated by pulses which are produced by applying the output sine wave of push-pull amplifier 6 to a clipper amplifier 34, differentiating the output of clipper amplifier 34 in a differentiating circuit 36, and then applying the differentiated signal to a conventional flip-flop frequency divider 38. The output of the flip-flop frequency divider 38 is used to operate switches 30 and 32. The output from flip-flop frequency divider 38 is a pulse train having a pulse repetition rate equal to one-half of the frequency of the input sine wave signal. Thus, the R-C circuits are grounded alternately for a complete cycle.

The R and C voltages to ground are applied through identical isolation amplifiers 42 and 44 (emitter follower type with unit gain) and transformers 46 and 48 to a conventional phase meter system 50. This phase meter system has two identical input channels which comprise clipper amplifiers 52 and 54 to which the R and C voltages are separately applied, and differentiators 56 and 58 which differentiate the output of the respective amplifiers 50 to form pulses which are applied to a flip-flop circuit 60.

The phase meter has two outputs. One side of flip-flop 60 produces a train of pulses of nearly 90° width produced alternately by the two R-C circuits. The other side of flip-flop 60 produces a train of pulses of nearly 270° width produced alternately by the two R-C circuits. It is to be noted that if an unknown capacitor X is as good as the standard capacitor, i.e., has negligible dissipation, the pulses will be substantially exactly 90° and substantially exactly 270°.

The two outputs of the phase meter, i.e., of the flip-flop 60, are applied through a dual adding network stage 62 to an amplifier 64. The dual adding networks of stage 62 are alternately grounded through a pair of switches 66 and 68 which are actuated by the output of flip-flop frequency divider 38. Thus, the adding networks are internally grounded alternately for a complete cycle in synchronism with the grounding of R-C junctions 24 and 26. The input to amplifier 64, therefore, is a train of pulses which consists of the summation of the alternately keyed pulse trains of nearly 90° width and 270° width produced by the standard and unknown R-C circuits. The output of amplifier 64 is integrated by an integrating circuit 70, producing a D.C. voltage which is applied to a chopper amplifier 72. Chopping at the input and output of chopper amplifier 72 is accomplished by switches 74 and 76 which are keyed alternately by signals produced by a flip-flop frequency divider 78. The flip-flop 78 operates in response to the output of the flip-flop frequency divider 38, the output of the latter being applied first to a differentiating circuit 80. Since the divider 78 is triggered by the output of divider 38, any error produced by incomplete integration of the voltage out of the phase meter 50 is eliminated.

The output of the chopper amplifier 72 is applied to a meter M through a capacitor 82. The meter can be calibrated directly in degrees (defect angle of the unknown capacitor) or in dissipation factor. It is to be observed that the meter M is connected to switch 76 through a variable calibration resistor 84. Similarly, zeroing of the meter is effected by means of a potentiometer 86 which is connected between ground and a suitable voltage source V. The slider of potentiometer 86 is connected to switches 74 and 76 and also to the junction of a capacitor 88 and a resistor 90. The latter functions to remove the charge on capacitor 82 when the meter M is off. When switch 76 is open and switch 74 is closed, the input to chopper amplifier 72 is connected to ground through the potentiometer 86. Alternatively, when switch 76 is closed and switch 74 is open, the input of integrator 70 is applied directly to amplifier 72. Due to the division by 4 effected by dividers 38 and 78, switches 74 and 76 are closed alternately for two full cycles.

The chief reason for using a chopper A.C. amplifier instead of a D.C. amplifier to amplify the output of integrator 70 is that a chopper amplifier is better suited to amplify relatively low D.C. signals such as are produced by integrator 70. The output of chopper amplifier 72 is a square wave. It is recognized that the square wave could be rectified and then applied to the meter. However, in the present invention, it is preferred to key the meter as described so that all of the pulses applied to the meter are of the same polarity.

Figure 2:
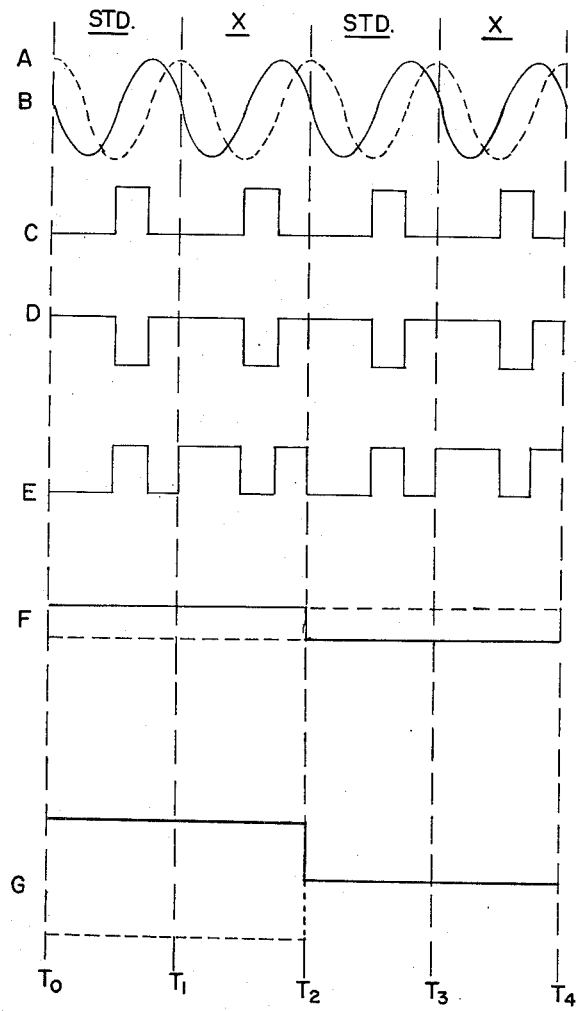
FIG. 2 illustrates certain pertinent wave forms which are characteristic of the present invention.

FIGURE 2 illustrates the wave forms of various signals in the system of FIGURE 1. Curves A and B represent the sine wave R and C voltages which are applied as an input to the phase meter. Because of the keying effected by switches 30 and 32, the portions of waves A and B between the times $T_0$ and $T_1$ are the voltages produced by the standard or known R-C circuit. The portions of signals A and B between times $T_1$ and $T_2$ are produced by the unknown R-C circuit. The portions of the signals between times $T_2$ and $T_3$ are attributable to the standard R-C circuit. Similarly, the portions of the signals between $T_3$ and $T_4$ are attributable to the unknown R-C circuit.

Wave form C represents the output of one side of the flip-flop 60 of phase meter 50. This output consists of nearly 90°-width pulses produced alternately by the two R-C circuits. Wave form D represents the output of the other side of the phase meter flip-flop 60. This wave form effectively consists of nearly 270°-width pulses produced alternately by the two R-C circuits. Wave form E represents the output of amplifier 64 before it is integrated by integrator 70. It is the summation of wave form C between times $T_0$ and $T_1$, times $T_2$ and $T_3$, etc., and wave form D between times $T_1$ and $T_2$, times $T_3$ and $T_4$, etc. This pulse train is achieved by alternately keying in the two flip-flop output signals (represented by wave forms C and D) which are applied to the adding network stage 62.

Wave form F represents the input applied to the chopper amplifier 72. The wave form may be as indicated in full lines or as indicated in broken lines, depending upon the relative dissipation factor of the R-C circuits. This wave form is produced by the keying effected by switches 74 and 76. Wave form G represents the output of the chopper amplifier before it is integrated and metered. This wave form may be as represented in full lines or as represented in broken lines, depending upon the relative dissipation factors of the R-C circuit.

Figure 3:
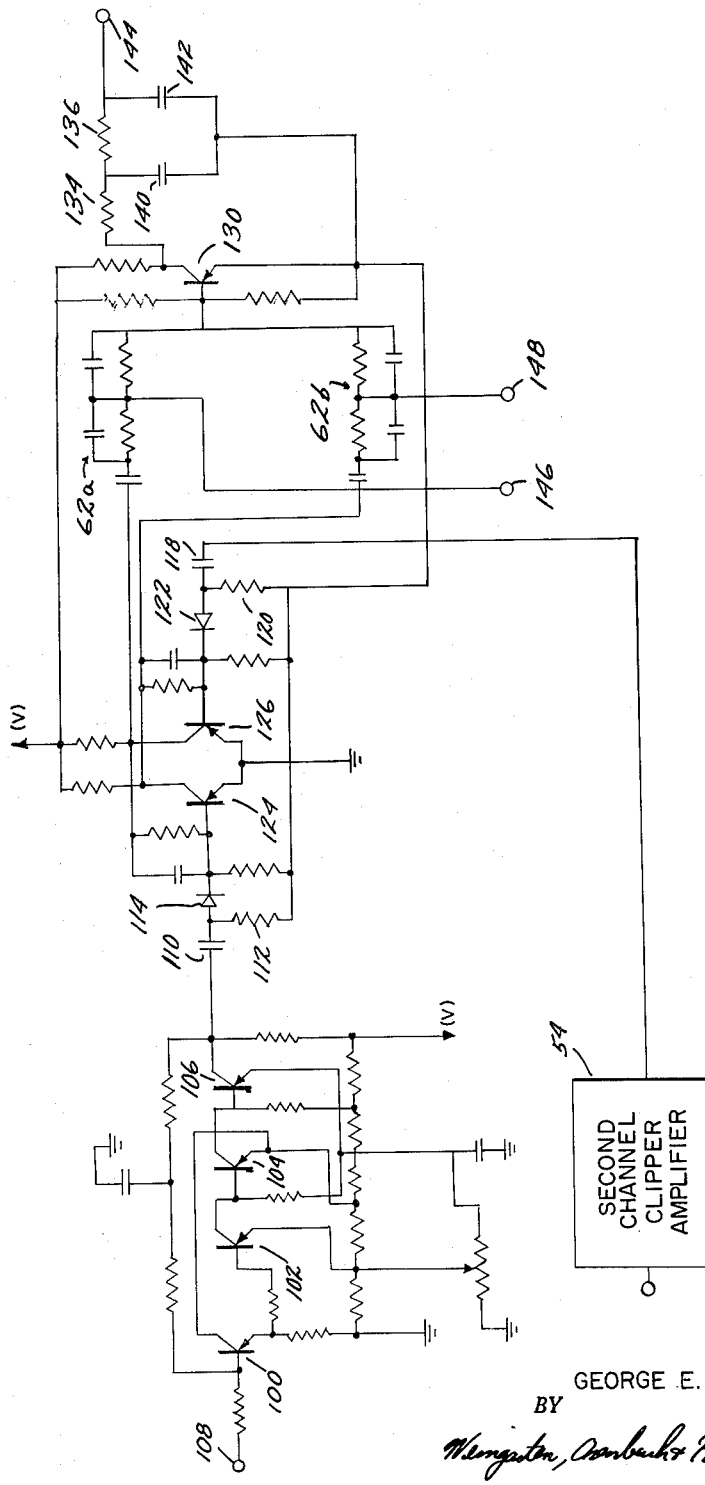
FIG. 3 is a diagram of the phase meter circuits, the adding networks, and the amplifier for the phase meter output, all identified generally in FIG. 1.

FIGURE 3 illustrates the circuits which make up phase meter 50, the adding network stage 62, the amplifier 64, and the integrator 70. In this figure, as in FIGS. 4 and 5, the letter V designates suitable voltage supplies. In FIGURE 3, the transistors 100, 102, 104, and 106 and the associated resistors and capacitors make up the clipper amplifier 52. The signal transferred from the isolation amplifier 42 by the transformer 46 is applied at terminal 108. The second channel clipper amplifier 54 is indicated in block form in FIGURE 3 since it is identical to clipper amplifier 52. The output of clipper amplifier 52 is taken at the collector of transistor 106. The differentiating circuit 56 to which the output of amplifier 52 is applied comprises capacitor 110 and resistance 112. The signal from the differentiating circuit 56 is applied to the flip-flop 60 by way of a diode 114. The differentiating circuit 58 to which the output of amplifier 54 is applied comprises capacitor 118 and resistor 120. The signal from the differentiating circuit 58 is applied to the flip-flop 60 by way of a diode 122.

The flip-flop 60 comprises two transistors 124 and 126. The output from the flip-flop is taken from the collectors of the two transistors. The output from transistor 124 is applied to the adding network 62b while the output from the transistor 126 is applied to the second adding network 62a. The two networks 62a and 62b are made up of resistors and capacitors connected as shown in FIGURE 3. The amplifier 64 to which is applied the resultant output from the two networks 62a, 62b comprises a transistor 130. The adding networks output is applied to the base of transistor 130. The output of amplifier 64 is taken at the collector of transistor 130 and is applied to integrating circuit 70 which comprises resistors 134 and 136 and capacitors 140 and 142. The integrated output is taken at terminal 144 which is connected to the junction of resistor 136 and capacitor 142. It is to be observed that the adding network 62a has connected to it an input terminal 146. Similarly, the other adding network 62b has connected to it an input terminal 148. These two terminals are connected to switches 66 and 68 respectively (see FIGURE 1).

Figure 4:
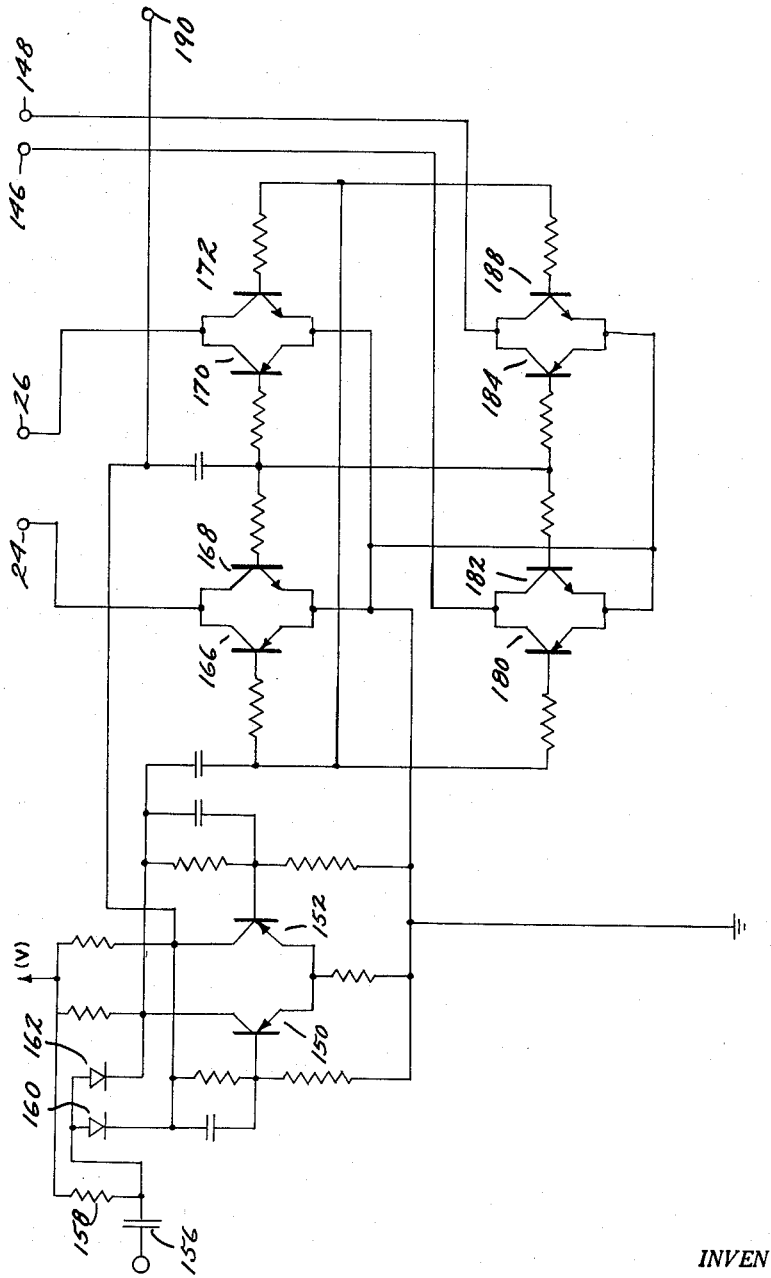
FIG. 4 is a diagram of some of the frequency dividing and switching circuits identified generally in FIG. 1.

Referring now to FIGURE 4, the flip-flop frequency divider 38 comprises two transistors 150 and 152 and associated capacitors and resistors. The differentiating circuit 36 to which the output of the clipper amplifier 34 is applied comprises a capacitor 156 and a resistor 158. The signal appearing at the junction of capacitor 156 and resistor 158 is applied to the two transistors 150 and 152 by way of two diodes 160 and 162. As indicated previously, the output of the flip-flop frequency divider 38 is applied to the four switches 30, 32, 66, and 68. In FIGURE 4, transistors 166 and 168 make up switch 30; transistors 170 and 172 make up switch 32; transistors 180 and 182 comprise switch 66; and transistors 184 and 188 comprise switch 68. The collectors of transistors 166 and 168 are connected to the junction 24 of the standard R-C circuit. The collectors of transistors 170 and 172 are connected to the junction 26 of the unknown R-C circuit.

The collectors of transistors 180 and 182 are connected to terminal 146 of adding network 62a. The collectors of transistors 184 and 188 are connected to terminal 148 of adding network 62b. The emitters of all four transistors are connected to ground. Due to the manner in which they are connected and also due to their characteristics, transistors 166, 168, 180, and 182 will conduct simultaneously with each other but alternately with transistors 170, 172, 184, and 188.

The collector of transistor 152 is also connected to an output terminal 190. The latter is connected to differentiating circuit 80. Referring now to FIG. 5, differentiating circuit 80 comprises a capacitor 192 and a resistor 194. The junction of capacitor 192 and resistor 194 is connected to flip-flop frequency divider 78 by way of two diodes 196 and 198. The flip-flop frequency divider 78 comprises two transistors 200 and 202 and associated resistors and capacitors. The outputs appearing at the collectors of transistors 200 and 202 is applied to switches 74 and 76. Switch 74 comprises two transistors 206 and 208 and switch 76 comprises transistors 210 and 212. The collector of transistor 200 is connected to the bases of transistors 206 and 212. The collector of transistor 202 is connected to the bases of transistors 208 and 210. Thus, since each switch 74 and 76 comprises a PNP transistor and also an NPN transistor, and due to the manner in which the outputs of the transistors 200 and 202 are connected to the transistors 206, 208, 210, and 212, the switches 74 and 76 will operate alternately. The collectors of transistors 206 and 208 are coupled alternately. The collectors of transistors 206 and 208 are coupled to the base of a transistor 216 which together with two additional transistors 218 and 220 form the nucleus of chopper amplifier 72. Also connected to the base of transistor 216 is terminal 144 of the integrating network 70 (FIGURE 3). Thus, the signal from the integrating circuit 70 is applied as an input to the base of transistor 216 of the chopper amplifier.

The collectors of transistors 210 and 212 are connected to a resistor 224 which is connected in series with variable calibrating resistor 84 (see FIGURE 1). The tap of variable resistor 84 is connected to one side of meter M. The opposite side of meter M is connected by capacitor 82 to the emitter of transistor 220.

In using the instrument, it is first necessary to obtain a zero setting. This is achieved by connecting standard capacitors having negligible dissipation between terminals 12a and 12b and also between terminals 18a and 18b, and then adjusting potentiometer 86. Preferably, but not necessarily, the meter has a zero center scale, calibrated in degrees. In practice, there has been used a zero center scale having a range of plus 2° and minus 2°. This range is satisfactory for most production testing of capacitors.

The foregoing invention has several notable advantages. It is stable. It provides a direct indication of the difference between a standard and an unknown capacitor. It is especially suitable for production testing where a large number of capacitors of the same type must be checked for tolerances. Moreover, since its operates as fast as capacitors can be substituted, it can easily be hooked up to an automated production setup.

Obviously, many modifications and variations of the present invention are possible in the light of the above teachings. It is to be understood, therefore, that the invention is not limited in its application to the details of construction and arrangement of parts specifically described or illustrated, and that within the scope of the appended claims, it may be practiced otherwise than as specifically described or illustrated.

I claim:

1. A dissipation factor measuring instrument comprising two series R-C circuits, one involving a standard capacitor and the other involving an unknown capacitor, means for alternately keying the R and C voltages (nearly 90° out of phase) of each circuit to a single flip-flop phase meter whereby one output of the flip-flop consists of pulses of nearly 90° width produced alternately by the two R-C circuits and the other flip-flop output consists of pulses of nearly 270° width produced alternately by the two circuits, means for alternately keying said two flip-flop outputs in synchronism with the R-C circuit keying to produce a useful output pulse train which consists of the summation of the alternately keyed pulse trains of nearly 90° width and nearly 270° width, and means for integrating said useful pulse train to produce a D.C. output proportional to the difference in the nearly 90° phase angles produced by the standard and unknown capacitors.

2. An instrument as defined by claim 1 further including means for amplifying said D.C. output, and means responsive to said D.C. output for indicating the dissipation factor or defect angle of the unknown capacitor.

3. A dissipation factor measuring instrument which comprises two series R-C circuits, one involving a standard capacitor and the other involving an unknown capacitor, means for applying a common alternating current signal to both circuits whereby to produce R and C voltages in each circuit, a flip-flop, means for alternately applying to said flip-flop the R and C voltages of one R-C circuit and the R and C voltages of the other R-C circuit whereby to produce a flip-flop output comprising a train of pulses of nearly 90° width produced alternately by said two circuits, and means responsive to said train of pulses for producing a D.C. output proportional to the difference in the phase angles produced by the standard and unknown capacitors.

4. A dissipation factor measuring instrument which comprises two series R-C circuits, one involving a standard capacitor and the other involving an unknown capacitor, means for applying a common alternating current signal to both circuits whereby to produce R and C voltages in each circuit, a flip-flop, means for alternately applying to said flip-flop the R and C voltages of one R-C circuit and the R and C voltages of the other R-C circuit whereby to produce two flip-flop outputs, one of said outputs comprising a train of pulses of nearly 90° width produced alternately by said two circuits, the other of said outputs comprising a train of nearly 270°-width pulses produced alternately by said two circuits, and means responsive to said two outputs for producing a D.C. output proportional to the difference in the phase angles produced by the standard and unknown capacitors.

5. A dissipation factor measuring instrument as defined by claim 4 further including means responsive to said D.C. output for indicating the dissipation factor of said unknown capacitor.

6. A dissipation factor measuring instrument which comprises two circuits, one circuit involving a resistor connected in series with a first pair of terminals for connection to a standard capacitor and the other circuit involving a resistor connected in series with a second pair of terminals for connection to an unknown capacitor, means for applying a common alternating signal to both circuits whereby to produce both R and C voltages in each circuit when said circuits include standard and unknown capacitors connected across said first and second pairs of terminals respectively, a flip-flop, means for alternately applying to said flip-flop the R and C voltages of said one circuit and the R and C voltages of said other circuit whereby to produce a flip-flop output comprising a train of pulses of nearly 90° width produced alternately by said two circuits, and means responsive to said train of pulses for producing a D.C. output proportional to the difference in the phase angles produced by the standard and unknown capacitors.

References Cited in the file of this patent

UNITED STATES PATENTS

| | | |
|---|---|---|
| 2,138,344 | Geyger | Nov. 29, 1938 |
| 2,601,492 | Baker | June 24, 1952 |